United States Patent [19]
Siddoway et al.

[11] Patent Number: 5,535,434
[45] Date of Patent: Jul. 9, 1996

[54] CARRY CASE HAVING PAGING CIRCUITRY SECTION

[75] Inventors: Craig F. Siddoway, Davie; Gerald L. Giacomino, Coral Springs, both of Fla.

[73] Assignee: Motorola, Inc., Schaumburg, Ill.

[21] Appl. No.: 185,333

[22] Filed: Jan. 24, 1994

[51] Int. Cl.⁶ .................... H04B 1/08; H04B 1/16
[52] U.S. Cl. ............... 455/89; 455/90; 455/348; 455/349; 340/825.44
[58] Field of Search .................. 340/825.44; 455/89, 455/90, 344, 347, 348, 349, 351; 379/58, 59, 433, 434; D14/138, 147, 148, 151; 224/902, 269, 242

[56] References Cited

U.S. PATENT DOCUMENTS

| 4,677,654 | 6/1987 | Lagin et al. | 455/90 |
| 4,856,088 | 8/1989 | Oliwa et al. | 455/349 |
| 4,879,759 | 11/1989 | Matsumoto et al. | 455/351 |
| 5,033,109 | 4/1991 | Kawano et al. | 455/90 |
| 5,303,291 | 4/1994 | Takage et al. | 379/434 |
| 5,369,788 | 11/1994 | Nagai | 455/90 |

FOREIGN PATENT DOCUMENTS

| 63-164716 | 7/1988 | Japan | 455/349 |
| 9008431 | 7/1990 | WIPO | 455/357 |
| 9112673 | 8/1991 | WIPO | 455/90 |
| 9208293 | 5/1992 | WIPO | 455/90 |

*Primary Examiner*—Chi H. Pham
*Attorney, Agent, or Firm*—John G. Rauch; Donald C. Kordich; Barbara R. Doutre

[57] ABSTRACT

A carry case (102) for transporting an electronic device, such as a radio (100) or controller module (300), and providing paging capability when combined with the electronic device. The carry case includes a housing and contained within the housing is a first part or first section of a pager while the electronic device contains a second part or second section of the pager. Electrical interface contacts (504) located within the carry case (102) and electrical interface contacts (204) located within the electronic device allow for the paging circuitry to connect and form a complete pager. The electrical interface contacts of the electronic devices are common so that either can be combined with carry case (102) to provide either a radio and pager combination or a pager only option.

4 Claims, 6 Drawing Sheets

CARRY CASE HAVING PAGING CIRCUITRY SECTION

TECHNICAL FIELD

This invention relates to carry cases for use with electronic devices and more specifically to electronic carry cases.

BACKGROUND

Communication devices, such as radios, are often used in conjunction with carry cases to allow the user hands-free carrying capability. Paging devices and radios can be worn in separate holders but the increase in weight and size can become cumbersome to the user. Radios that include paging capability, while reducing the number of items worn by the user, force the user to carry both items at all times. While only paging capability may be desired, the user is forced to carry the entire radio. Hence, there is a need for a carry case that provides increased flexibility to the user with regards to communication options while reducing cost and weight.

DETAILED DESCRIPTION OF THE PREFERRED EMBODIMENT

Figure 1:
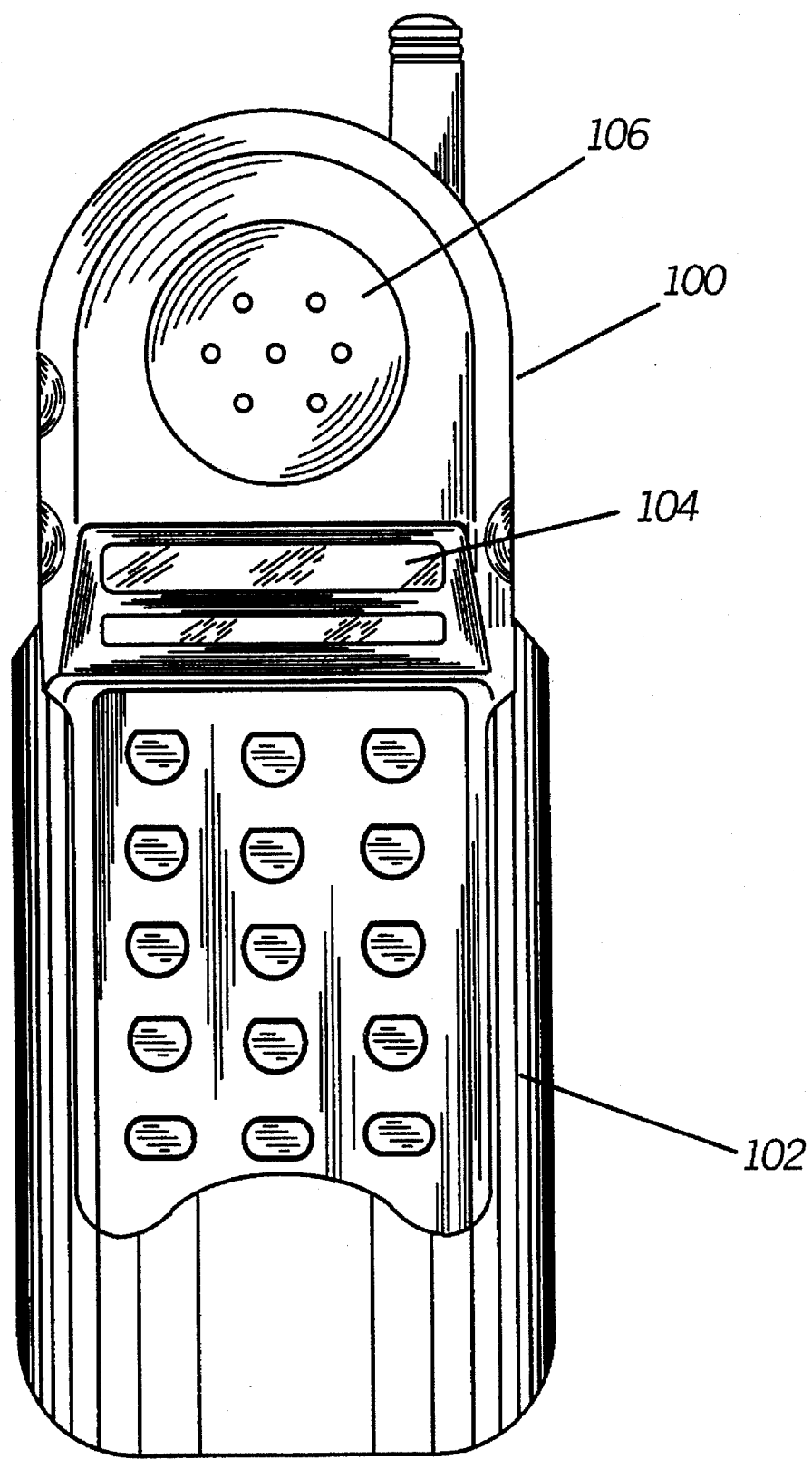
FIG. 1 shows a drawing of a radio inserted in a carry case in accordance with the invention.

In a first embodiment of the invention, a communication device, such as a radio 100 as shown in FIG. 1 of the accompanying drawings, is shown inserted into a carry case 102. The carry case 102 acts as a housing receptacle for the communication device 100 and also contains a first section of a pager (not shown and which will be discussed later) located within the housing 102 and a set of contacts (not shown) for electrically interconnecting with the radio 100. The first section of the pager includes a conventional radio transceiver section for providing RF capability to the pager. A second pager section, which in the first embodiment comprises a pager controller section, is located within radio 100. The combination of the carry case radio transceiver 102 and pager controller located within radio 100 form a pager once radio 100 is mated to carry case 102. A display 104 located within the radio 100 is used as a means to translate messages to the user when a page is received. Audio circuitry, located within the radio 100, is used to generate a tone or verbal message to alert the user to an incoming message which is presented via a speaker port 106. In this first embodiment of the invention, the user is able to employ one device that provides both radio and paging capability, the carry case 102 providing one section of the pager and the radio 100 providing the second section of the pager.

Figure 2:
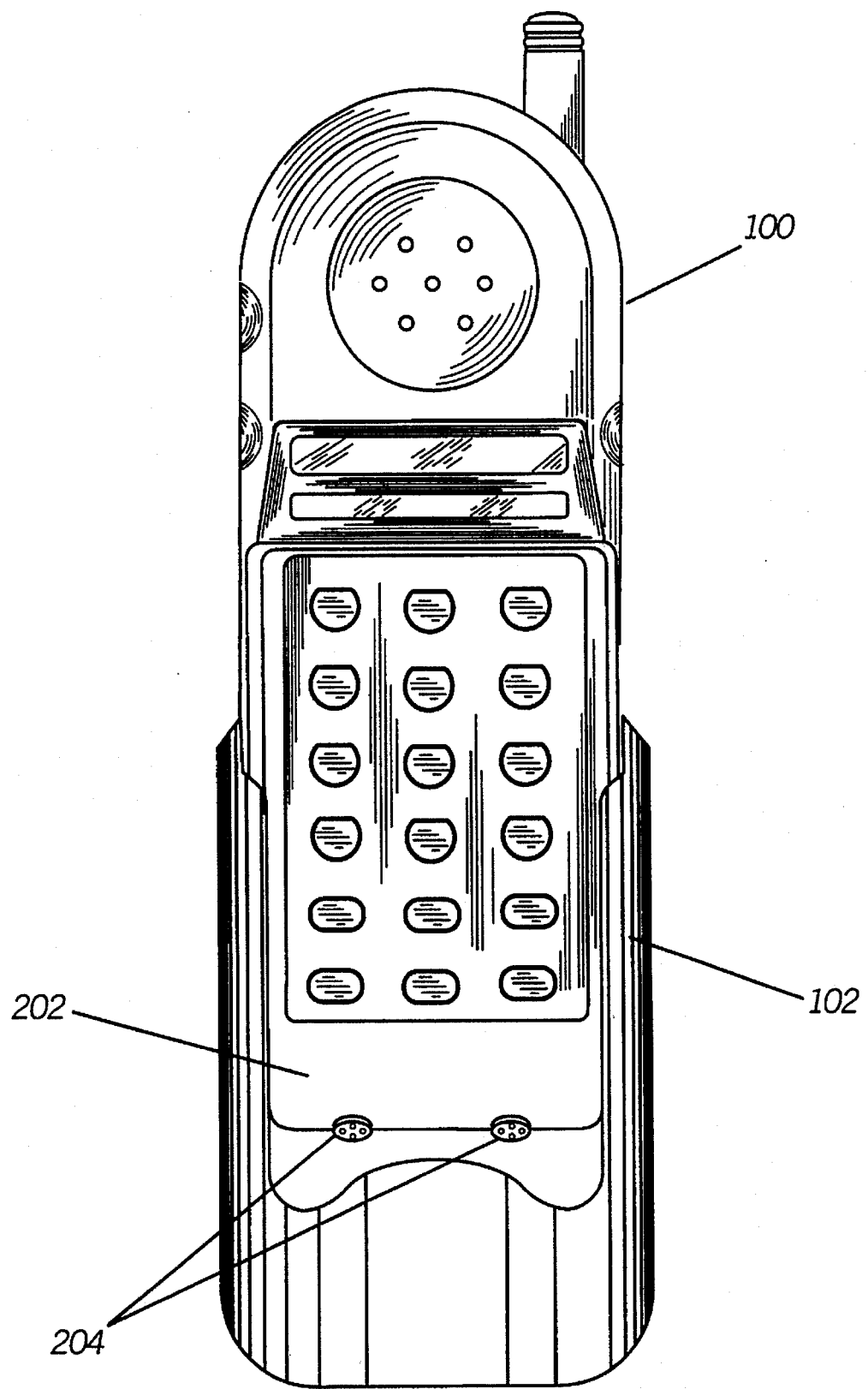
FIG. 2 shows a drawing of a radio including its interface mechanism partially enclosed in a carry case in accordance with the invention.

Referring now to FIG. 2, the radio 100 further comprises a radio interface portion 202 which includes the second section or controller section of the pager located within radio 100 and also includes electrical interface contacts 204. Pager controller functions, such as data processing for the pager, are interfaced from the radio interface portion 202 to the RF circuitry located within the carry case 102 through electrical interface contacts 204. Electrical interface contacts 204 mate to corresponding contacts (not shown) located in housing 102. Each of the electrical interface contacts 204 provide for a plurality of electrical interconnects forming a bus to transfer information between the radio 100 and the carry case 102. The pager controller section located within interface portion 202 and RF circuitry located within the carry case 102, are combined to form a pager when radio 100 is inserted into carry case 102. Both the radio 100 and the pager functions can be used in this first embodiment of the invention once radio 100 is mated to the carry case 102.

Figure 3:
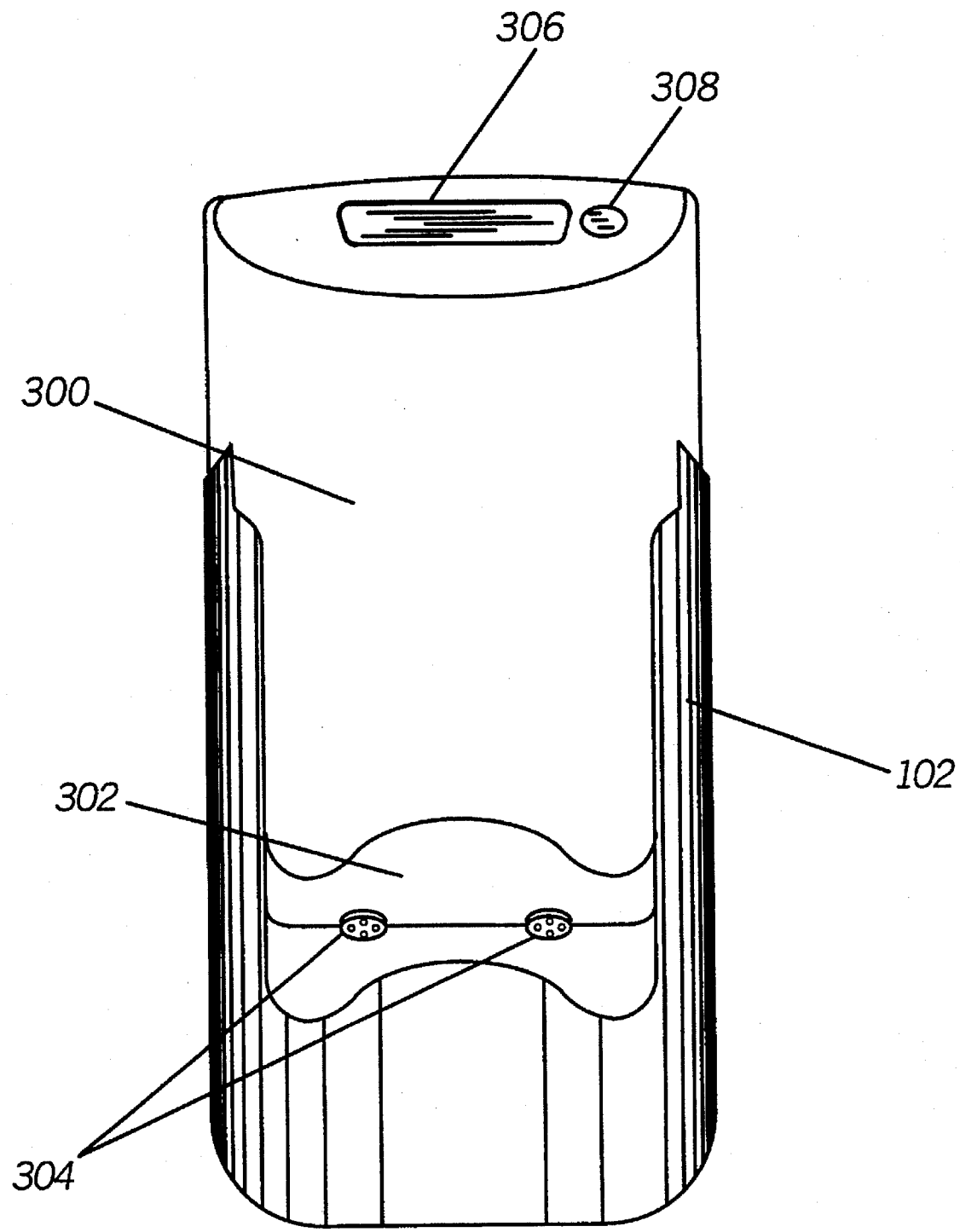
FIG. 3 shows a drawing of a controller module including its interface mechanism being inserted into a carry case in accordance with the invention.

A second embodiment of the invention is shown in FIG. 3 where a pager is presented independently from the radio 100. The radio 100 is removed from the carry case 102 and an electronic device 300 having the second section of a pager, such as a controller module, is inserted in its place. Carry case 102 includes back and side walls that act as a guide for inserting the controller module 300 into the carry case. The controller module 300 also includes circuitry for porting audio to a speaker 308 and for displaying information to a display 306. The controller module 300 further comprises an interface portion 302 which includes power sources and a pager controller, such as a micro controller as known in the art, for data processing functions. The interface portion 302 also includes electrical interface contacts 304, similar to electrical interface contacts 204 shown in FIG. 2, used to interconnect the pager controller functions and power sources to the RF circuitry located within the carry case 102.

Figure 4:
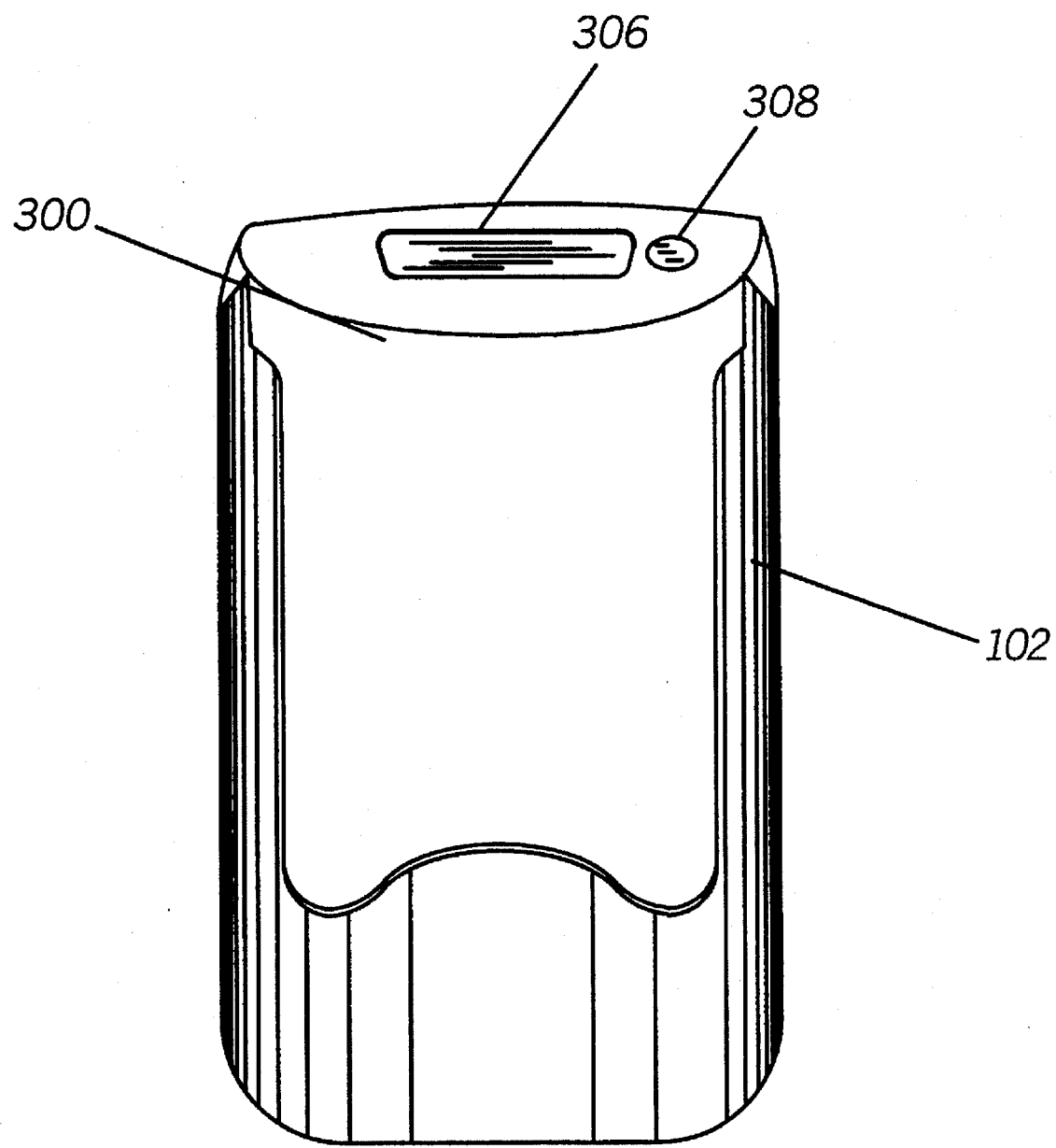
FIG. 4 shows a drawing of the controller module of FIG. 3 fully inserted into the carry case thereby forming a pager in accordance with the invention.

In FIG. 4, the controller module 300 is shown fully inserted within housing 102. The back and side walls of the carry case 102 act as a retention area to hold the electronic device 300 in place once fully inserted into the carry case. In this condition the two sections form a fully functional pager. The display 306 located within the controller module 300 is used to translate messages to the user when a page is received. Audio tones or vibrations can also be generated to alert the user of an incoming message via speaker port 308. The radio 100, which has been removed from the carry case, can still function as a separate radio unit if the user so desires.

Figure 5:
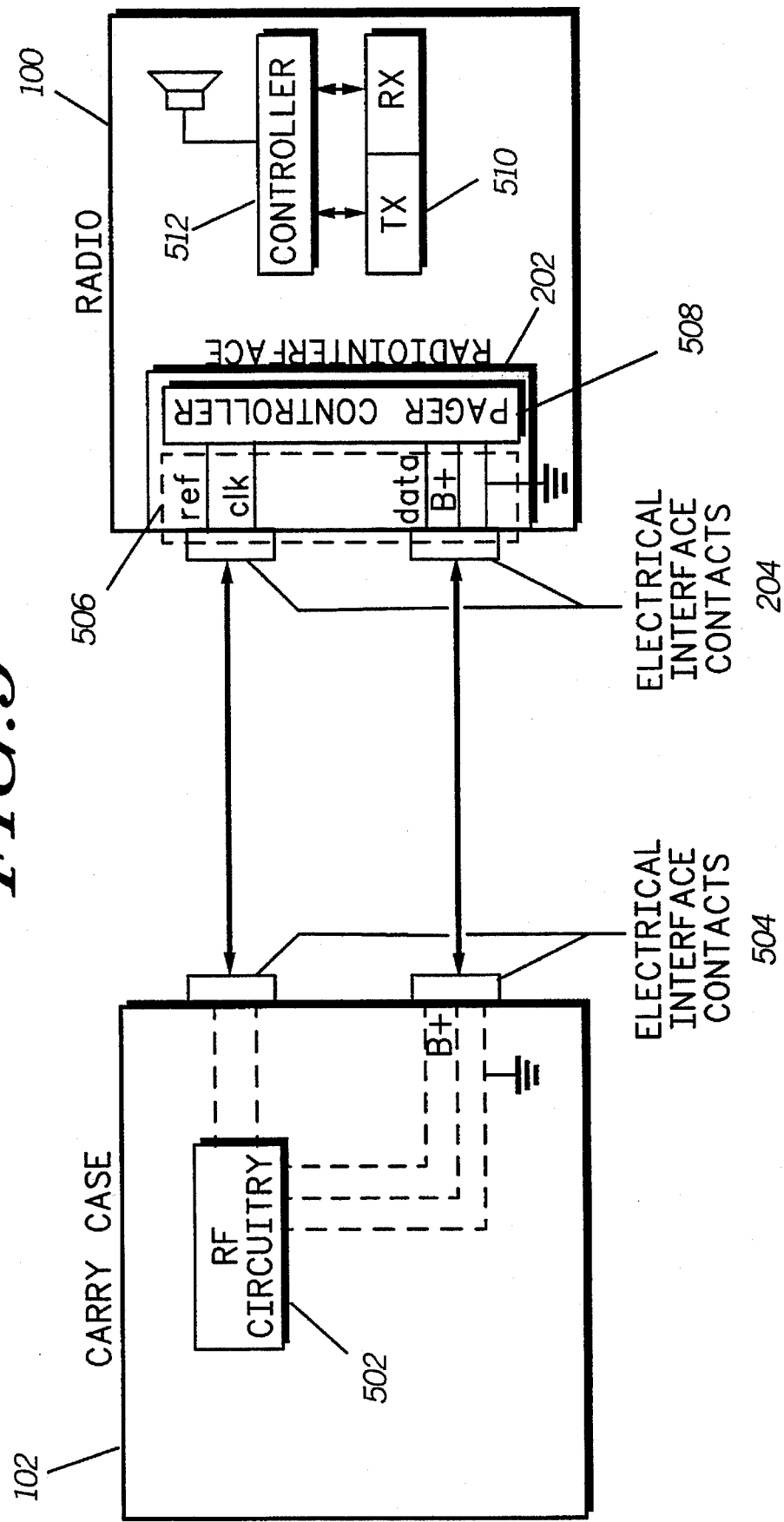
FIG. 5 shows an electrical block diagram of the carry case and radio of FIG. 1 in accordance with the invention.

Referring now to FIG. 5, an electrical block diagram of the carry case 102, radio 100, and the electrical interconnects is shown. The carry case 102 comprises the first section of the pager which in this case is shown as RF circuitry 502 and electrical interface contacts 504. The radio 100 comprises a transmitter and receiver section 510, as found in a conventional radio as known in the art, and a controller 512 for data and audio processing, such as a MC68HC11 microprocessor manufactured by Motorola Inc. The radio 100 further comprises radio interface portion 202 (the second section of the pager), which includes a pager controller 508, such as a micro controller, for providing such functions as data, clock, reference and power sources 506. The pager controller functions are ported to electrical interface contacts 204 located within the radio interface portion 202. The electrical interface contacts 504 located within carry case 102 act as a means of transferring the pager controller functions, such as data, clock, reference, and power 506 from electrical interface contacts 204. The electrical interface contacts 204 and 504 provide for a plurality of functions to be transported between the radio 100 and carry case 102 via such means as pins or flexes. When the radio 100 is inserted into the carry case 102, the electrical interface contacts 204 and 504 mate and the pager will be formed by the electrical interconnect of RF circuitry 502 and pager controller 508. The side walls and back housing of carry case 102 act as a retention means and a guide for inserting the radio into place so that continuous electrical contact will be maintained between the electrical interface contacts 204 and 504.

In a similar fashion, when the radio 100 is removed from the carry case 102, and a controller module is inserted, the electrical interface contacts 304 located within the controller module 300 will interface to electrical interface contacts 504 located within the carry case 102 to form a pager.

Figure 6:
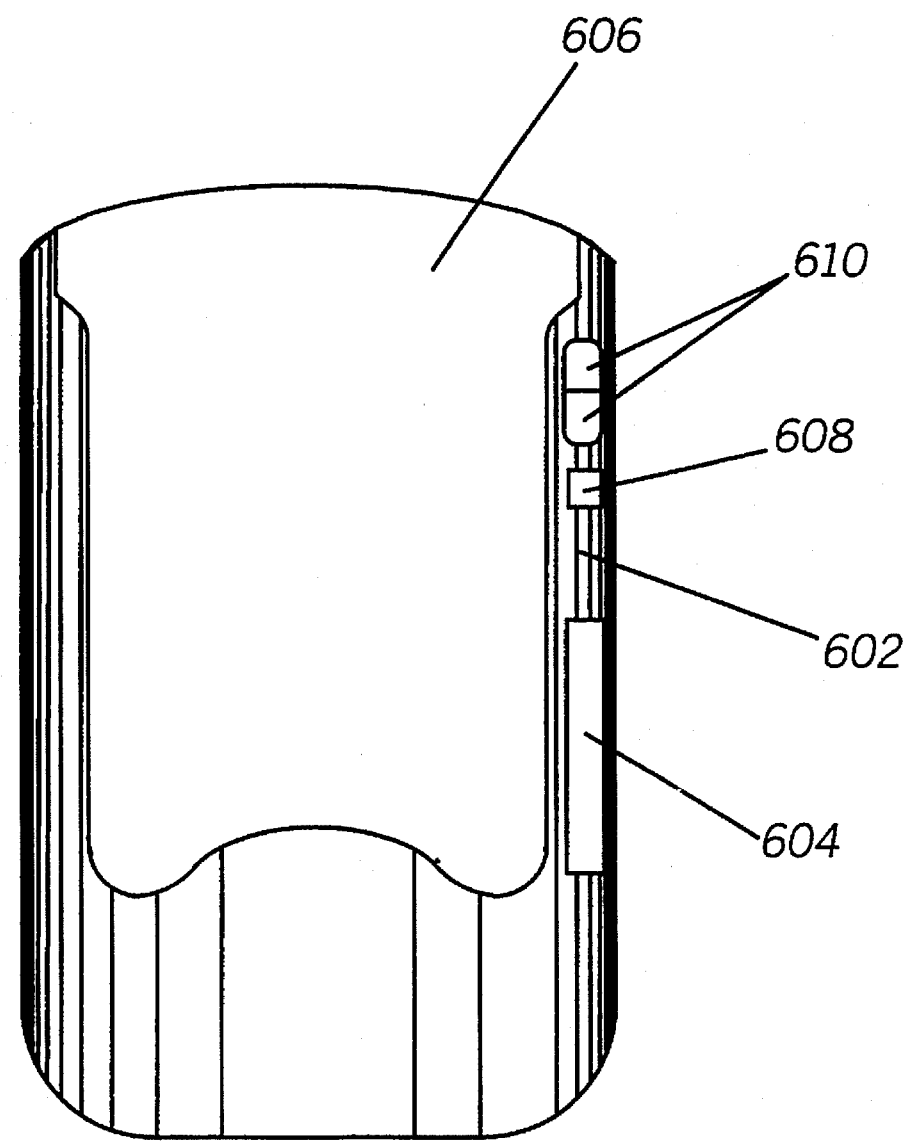
FIG. 6 shows a drawing of a carry case in accordance with the invention.

In a third embodiment of the invention, shown in FIG. 6, a carry case 600 acts as a fully operational pager and carry case for a hand held device, such as a two-way radio. A fully functional pager is located within housing area 602. Side walls located within housing area 602 act as a means for guiding the radio into the carry case 600. The carry case 600 includes retention area 606 for receiving the radio, and holding it in place. A display 604, speaker port 608, and controls for on/off and acknowledge 610 are located within the housing area 602 to alert the user to an incoming page and translate messages. The carry case 600 also includes a battery pack to provide power to the pager within the housing area 602. With the radio inserted into the carry case 600, both radio and pager functions are available to the user. In this embodiment, the carry case 600 acts as an independent pager with a means of transporting an electronic device, such as a radio. A user can insert a radio into the carry case 600 and have both paging and radio capability without the need to carry two separate carry cases for each device. The radio can be removed when the user wishes to employ the pager only option thus decreasing the size and weight of items the user is wearing. When the radio is removed, the carry case 600 acts as an independent pager without any additional hardware thus fleeing the user from the extra weight of the radio while maintaining paging capability. The carry case 600 could further be used to carry personal items such as credit cards and identification once the radio has been removed.

While several embodiments of the invention have been described, it will be clear that the invention is not so limited. Any number of combinations could be used for achieving the same end result. For example, the carry case could comprise the controller section and power sources for the pager while the RF circuitry for the pager could reside in the radio or module. It will also be dear to one skilled in the art that the micro controller 512 of the radio 100 could be powerful enough to act as the controller for the first section of the pager without the need for a controller in the radio interface portion 202, only the electrical interface contacts would be needed to transfer the functions between the radio 100 and the carry case 102.

Hence, the carry case as described by the invention provides flexibility and a wide range of portability options to the user. A radio and pager combination allows for both radio and paging functions in one combination device. If the user desires paging capability only, the paging only option can be employed by removing the radio from the carry case and inserting an electronic module thus reducing the size and weight of the device. The user may employ the radio separately if so desired with the paging only option.

A carry case that provides all paging circuitry within the carry case housing 600 allows the user to transport the radio in a receptacle that provides paging capability and to use both devices separately if desired without any additional hardware.

What is claimed is:

1. A carry case and electronic device in combination, wherein a first pager section and a second pager section form a pager that is fully functional, the combined carry case and electronic device comprising:

the carry case including,
the first pager section, the first pager section including a pager controller and
electrical interface contacts for interfacing to the electronic device; and the electronic device including,
an interface portion having the second pager section and electrical interface contacts for coupling to the carry case's electrical interface contacts, the second pager section including RF circuitry.

2. The carry case and electronic device in combination as defined in claim 1, wherein the first pager section comprises RF circuitry.

3. The carry case and electronic device in combination as defined in claim 1, wherein the second pager section comprises a pager controller.

4. A carry case and a radio in combination, comprising:
the carry case including,
a housing having a retention area for receiving the radio,
a first pager section located within the housing, the first pager section including an antenna for receiving electromagnetic signals and RF circuitry for converting the electromagnetic signals to electrical signals, and
electrical interface contacts coupled with the first pager section; and the radio including,
a radio interface portion having a second pager section including a pager controller and electrical interface contacts for coupling the second pager section to the carry case's electrical interface contacts, the radio interface portion conveying the electrical signals from the RF circuitry to the radio; and
the radio interface portion when mated to the carry case allows for the first and second pager sections to form a pager that is fully functional.

* * * * *